United States Patent [19]

Serrill

[11] 4,155,188

[45] May 22, 1979

[54] FISH ACTIVATED LIGHT USED IN CONJUNCTION WITH FISHING LINE

[76] Inventor: DeHart M. Serrill, Box 2, 3rd Ave. Springdale Lake Estates, Belton, Mo. 64012

[21] Appl. No.: 786,264

[22] Filed: Apr. 11, 1977

[51] Int. Cl.² ............................................. A01K 97/12
[52] U.S. Cl. .................................................. 43/17
[58] Field of Search ...................... 43/17; 340/272, 283

[56] References Cited

U.S. PATENT DOCUMENTS

| | | | |
|---|---|---|---|
| 2,354,279 | 7/1944 | Ross .......................................... | 43/17 |
| 2,377,161 | 5/1945 | Strange .............................. | 43/17 UX |
| 2,732,543 | 1/1956 | Mogren .............................. | 43/17 X |
| 2,816,388 | 12/1957 | Hartley .................................... | 43/17 |
| 3,120,072 | 2/1964 | Rybarski .................................. | 43/17 |
| 4,023,298 | 5/1977 | Story ......................................... | 43/17 |

*Primary Examiner*—Harold D. Whitehead
*Attorney, Agent, or Firm*—Lowe, Kokjer, Kircher, Wharton & Bowman

[57] ABSTRACT

A lighting device for use with a fishing line is the subject of the present invention. A base support which is positionable on the ground or floor of a boat mounts an elongated transparent tubular member. Within the tubular member is contained a light bulb, battery and gravity activated switch. The tubular member is pivotally mounted relative to the base support and will always assume a vertical upright position regardless of the angle of the supporting surface. A pair of V-grip couplers at the top and bottom of the tubular member are adapted to releasably receive the fishing line. When the fishing line moves in response to a fish striking, the tubular member will be pivoted causing the fluid switch to close thereby lighting the bulb.

8 Claims, 6 Drawing Figures

U.S. Patent May 22, 1979 4,155,188
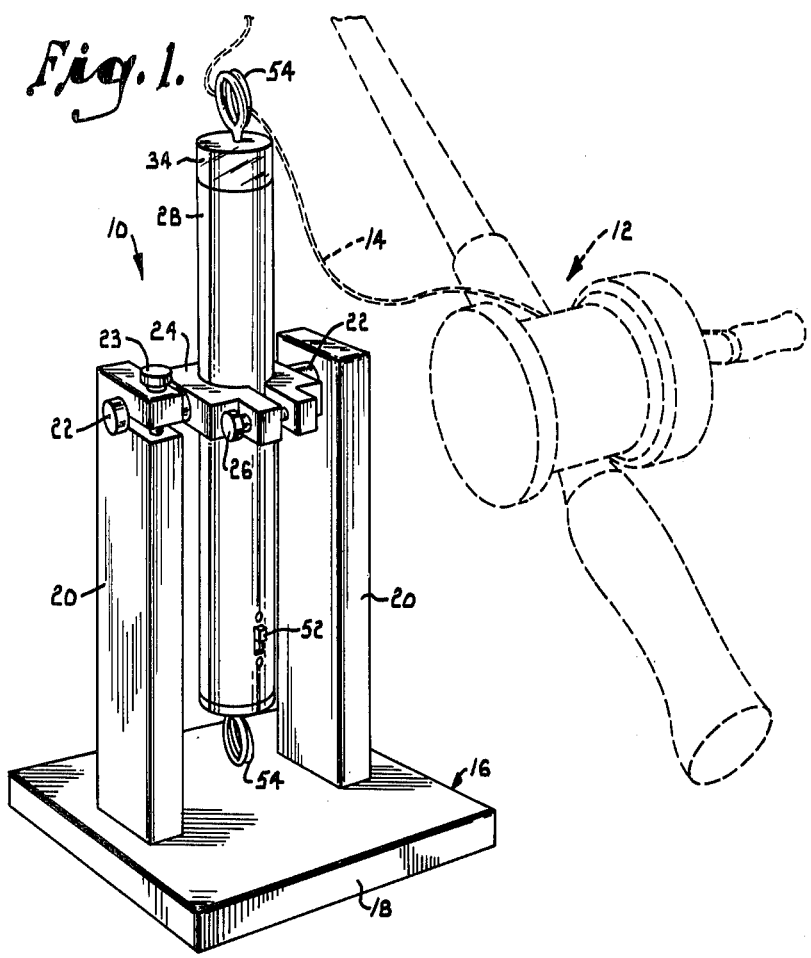
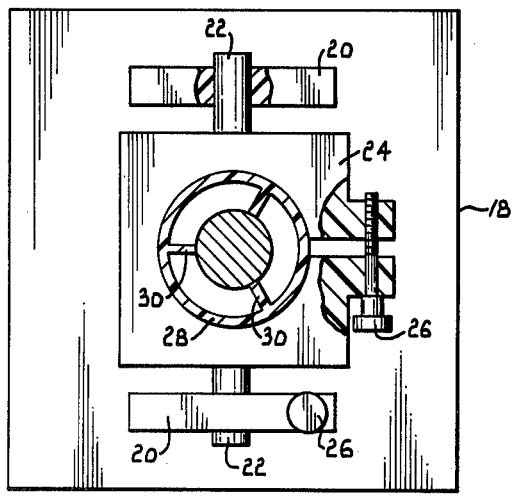
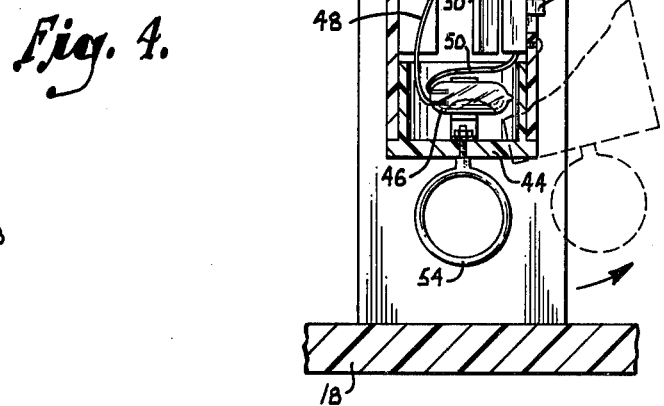
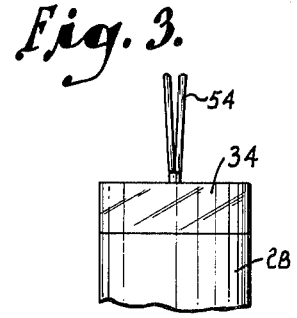

FISH ACTIVATED LIGHT USED IN CONJUNCTION WITH FISHING LINE

This invention relates to lighting devices generally and, more particularly, to a lighting device for use in conjunction with a fishing line.

Night fishing is a popular sport for many people. Oftentimes an individual who is unable to fish during the day will manage to find time to fish after dark. Also, certain types of fish e.g., catfish and walleye, actually bite better during darkness than in daylight hours. The difficulty with night fishing is that, unless the fisherman desires to hold his line the entire time he is fishing, he must have a light to shine on the line to indicate when a fish is striking at the bait. As it is often a considerable time interval between strikes, it is normally not feasible to hold the line the entire time. if a lantern is used and directed on the fishing line, bugs will be attracted to the light of the lantern. The same is true of a flashlight, even if the flashlight is periodically turned off. If the light is periodically turned off, there is always the possibility of missing a strike at the bait.

Known in the prior art are fishing lights which are activated upon a fish striking at the bait. All of the known prior art devices utilize some type of spring action to trigger the light in response to a fish striking at the bait. Devices of this type are satisfactory for fish which only strike at the bait once and take it at the initial strike. Such a prior art device is unsatisfactory, however, for fish which strike at the bait more than once before actually taking it. Manifestly, with this type of spring tensioned device, when a fish such as walleye or cat strikes once and tensions the line to turn on the light, it will be scared away.

It is, therefore, a primary object of the present invention to provide a fishing light which is activated only upon a fish striking the bait thereby saving energy and not attracting bugs.

Another object of this invention is to provide a fishing light which may be used on land of any terrain and also on water.

An important objective of the invention is to provide a fishing light wherein the entire illuminating means is encased in plastic thereby protecting the bulb from breakage.

It is also an important aim of the present invention to provide a fishing light which is activated only upon a fish striking at the bait and the sensitivity of which may be adjusted for different types of fishing.

As a corollary to the above aim, an important object of the invention is to provide a fishing light, the sensitivity of which is adjustable to accommodate movement of a boat for fishing over water.

It is a very important object of this invention to provide a fishing light which is activated only upon a fish striking the bait and wherein the fishing line is not placed under tension in response to the fish striking, thereby the fishing light will not scare away fish which habitually strike more than once before taking the bait.

Other objects of the invention will be made clear or become apparent from the following description when read in light of the accompanying drawings wherein:

FIG. 1 is a perspective view of the lighting device according to the present invention;

FIG. 2 is a side elevational view, largely in cross section, of the device shown in FIG. 1;

FIG. 3 is a fragmentary side elevational view looking in the direction of arrows 3—3 of FIG. 2; and FIG. 4 is a horizontal, cross-sectional view taken along line 4—4 of FIG. 1.

Referring initially to FIG. 1, the lighting device of the present invention is designated generally by the numeral 10 and is shown in proximity to a rod and reel designated generally by the numeral 12. A length of fishing line 14 is wrapped around and extends from the reel portion of assembly 12.

The lighting device 10 comprises a base support member 16 that includes a generally rectangular planar base plate 18 and two upwardly projecting parallel stanchions 20, both of which are rigid with base plate 18.

A two-part shaft 22 is journaled in stanchions 20 to pivotally mount a collar 24. Collar 24 is provided with an adjusting screw 26 for purposes to be made clear hereinafter.

Referring additionally to FIGS. 2 and 4, a longitudinally extending, cylindrical tube 28 is tightly held by collar 24. Tube 28 is preferably of some type of translucent or transparent material and is characterized within its interior by three longitudinally extending equispaced flutes 30 which serve to hold in place two small electrical batteries 32. The uppermost end of tube 28 is threaded to threadably receive a cap 34. A reflector collar 36 is seated upon the uppermost ends of flutes 30 and mounts a light bulb 38 for electrical contact with battery 32.

At the end of tube 28 opposite light bulb 38 a contact ring 40 is disposed on a seat presented by flutes 30. Extending upwardly from contact ring 40 is a coil contact spring 42 which is in electrical contact with lower battery 32. An end cap 44 seals the lowermost end of tube 28 and mounts a gravity switch 46. Lead wires 48 and 50 extend from switch 46 to a manually operable switch 52 and to contact ring 40.

Threadably received in each of the end caps 34 and 44 is a V-grip line holder 54. One of the line holders 54 is illustrated in FIG. 3.

In operation, the device 10 is positioned beneath rod and reel assembly 12 on the ground or floor of a boat. In this regard, it will normally be desirable to position the rod and reel at an angle relative to the surface either through a pole holding device or by simply bracing the rod against another object. Fishing line 14 is threaded through the uppermost V-grip 54 in the manner illustrated in FIG. 1. Placement of the line in lower V-grip 54 is optional and will depend upon the type of fishing being done, wind conditions and other factors such as the extent of rocking of a boat. The degree of sensitivity of device 10 to a fish striking line 14 may be partially adjusted by allowing for more or less slack in the line between the uppermost grip 54 and the end of the line. Sensitivity is also controlled by adjusting the position of tube 28 upwardly or downwardly relative to collar 24. Once the desired position for the tube is obtained, screw 26 is tightened to hold the tube in place relative to collar 24. Once the desired position for the tube is obtained, screw 26 is tightened to hold the tube in place relative to the pivotal axis provided for shaft 22. Sensitivity is further adjusted by adjusting the tension on the shaft as a result of tensioning screw 23.

When the sensitivity of the device 10 is properly set and a fish strikes line 14, the line will be pulled forwardly tilting device 10 about its axis into the position shown in broken lines in FIG. 2. This causes gravity switch 46 which may be of the mercury type, to close, thereby activating the circuit and illuminating bulb 38.

Manifestly, override switch 52 may be manually moved to an off position to always have an open circuit when the device is not intended to be in operation. It will be appreciated that the particular type of V-grip fasteners which are utilized permit line 14 to be quickly released from the device 10 to permit activation of the reel handle to pull in the fish. It is a particular advantage of the construction of my device that tube 28 will always assume a vertical position even when base plate 18 is on slanting terrain. It is of course important to position the device so that any pull on the line will tilt the tube in a direction which will close gravity switch 46.

From the foregoing description it will be appreciated that the device of the present invention may be adjusted to be highly sensitive to the most delicate type of fishing. In no case will activation of the light result in any jerking or pulling on the line which could scare the fish away. The light is activated only when a fish strikes, thereby eliminating the problem of drawing bugs which results if a light is operated continuously. The device may be used with any type of pole or rod and reel as well as with a fishing line which is not attached to a pole or reel.

Having thus described the invention, I claim:

1. A light device for use with a fishing line holding a bait and adapted to be illuminated by a fish biting the bait, said device comprising:
    a base support;
    opposed parallel upright stanchions coupled with said support;
    longitudinally extending illuminating means for emitting light disposed between said stanchions,
    said illuminating means being pivotal relative to said stanchion means from a normal position to a tilted position in response to a fish biting said bait and said illuminating means being balanced to return to said normal position in response to a fish releasing said bait;
    pivotal mounting means disposed intermediate the ends of said illuminating means for coupling the latter with said stanchions;
    means for receiving a section of said fishing line without placing tension on the line,
    said means for receiving said line holding the line during initial contact between the bait and the fish and automatically releasing said line in response to an upward lifting force being applied to the line; and
    switch means operable in response to said pivotal movement of said illuminating means to energize said illuminating means when in its tilted position and de-energize said illuminating means when in its normal position.

2. The invention of claim 1, wherein is included means for retarding said pivotal movement, said retarding means being adjustable to provide varying resistance force to the pivotal movement.

3. The invention of claim 1, wherein said means for holding said source of illumination comprises a longitudinally extending tubular member, said member being movable relative to said pivotal coupling and means for holding said member in a selected longitudinal position.

4. The invention of claim 3, wherein said tubular member encases said illuminating means, said tubular member being translucent to accommodate the passage of light therethrough.

5. The invention of claim 1, wherein said means for releasably coupling said holding means with said fishing line comprises first and second line holding elements disposed in vertically opposed relationship on opposite sides of the horizontal plane of the pivotal coupling of said holding means.

6. The invention of claim 5, wherein each of said first and second holding elements comprises a V-grip, said fishing line being received between the legs of said V-grip.

7. The invention of claim 1, wherein said switch means comprises an electrically conductive liquid.

8. The invention of claim 7, wherein said line receiving means comprises a V-grip.

* * * * *